United States Patent [19]
Takagi

[11] Patent Number: 5,485,475
[45] Date of Patent: Jan. 16, 1996

[54] DATA STORAGE DEVICE AND DATA MANAGING METHOD

[75] Inventor: Shiro Takagi, Kanagawa, Japan

[73] Assignee: Kabushiki Kaisha Toshiba, Kawasaki, Japan

[21] Appl. No.: 298,275

[22] Filed: Aug. 31, 1994

[30] Foreign Application Priority Data

Sep. 22, 1993 [JP] Japan ..................... 5-236922

[51] Int. Cl.$^6$ ..................... G06F 11/20
[52] U.S. Cl. ..................... 371/404; 371/40.2; 395/481; 395/600; 395/497.01
[58] Field of Search ..................... 371/10.1, 10.2, 371/10.3, 11.1, 21.1, 21.2, 40.1–40.4, 51.1, 68.1; 364/268.5, 268.2

[56] References Cited

U.S. PATENT DOCUMENTS

| | | | |
|---|---|---|---|
| 4,092,732 | 5/1978 | Ouchi | 364/900 |
| 4,870,643 | 9/1989 | Bultman et al. | 371/11.1 |
| 5,124,987 | 6/1982 | Milligan et al. | 371/10.1 |
| 5,148,432 | 9/1992 | Gordon et al. | |
| 5,278,838 | 1/1994 | Ng et al. | 371/10.1 |
| 5,284,478 | 2/1994 | Barlow et al. | 371/40.1 |
| 5,341,381 | 8/1994 | Fuller | 371/10.1 |
| 5,412,668 | 5/1995 | Dewey | 371/40.1 |

Primary Examiner—Roy N. Envall, Jr.
Assistant Examiner—Thomas E. Brown
Attorney, Agent, or Firm—Cushman, Darby & Cushman

[57] ABSTRACT

A data storage device includes a plurality of data disks for storing data in units of data blocks and a parity disk for storing parity data used for restoring data to the data disks. Data blocks on the respective data disks are managed with respect to whether each data block is used for data storage and managed with respect to whether data of each data block is used for computing parity. Each data block which is not used for data storage and is used for computing parity is detected. The parity data are updated based on data in the detected data blocks and the parity data stored to the parity disk corresponding to the detected data blocks.

14 Claims, 11 Drawing Sheets

FILE MANAGEMENT TABLE 21

| FILE No. (21a) | EXISTENCE FLAG (21b) | No. OF BLOCKS (21c) | ARRAY BLOCK No. (21d) |
|---|---|---|---|
| 1 | 1 | 3 | 1,2,3 |
| 2 | 1 | 2 | 4,5 |
| 3 | 0 | 0 | 0 |
| ⋮ | ⋮ | ⋮ | ⋮ |
| 100 | 0 | 0 | 0 |

ARRAY BLOCK MANAGEMENT TABLE 22

| ARRAY BLOCK No. (22a) | USE FLAG (22b) | CLEAR FLAG (22c) | |
|---|---|---|---|
| 1 | 1 | 0 | ▲ |
| 2 | 1 | 0 | |
| 3 | 1 | 0 | |
| 4 | 1 | 0 | HDD-1 |
| 5 | 1 | 0 | |
| 6 | 0 | 1 | |
| 7 | 0 | 1 | ▼ |
| ----- | ----- | ----- | |
| 1000 | 0 | 1 | ▲ |
| 1001 | 0 | 1 | |
| 1002 | 0 | 1 | HDD-2 |
| ----- | ---- | ---- | |
| 2000 | 0 | 1 | |
| 2001 | 0 | 1 | ▼ |
| ----- | ---- | ---- | HDD-3 |
| 3000 | 0 | 1 | |

FILE MANAGEMENT TABLE

| FILE No. (21a) | EXISTENCE FLAG (21b) | No. OF BLOCKS (21c) | ARRAY BLOCK No. (21d) |
|---|---|---|---|
| 1 | 1 | 3 | 1,2,3 |
| 2 | 1 | 2 | 4,5 |
| 3 | 0 | 0 | 0 |
| ⋮ | ⋮ | ⋮ | ⋮ |
| 100 | 0 | 0 | 0 |

*Fig. 2A*

ARRAY BLOCK MANAGEMENT TABLE

| ARRAY BLOCK No. (22a) | USE FLAG (22b) | CLEAR FLAG (22c) | |
|---|---|---|---|
| 1 | 1 | 0 | |
| 2 | 1 | 0 | |
| 3 | 1 | 0 | |
| 4 | 1 | 0 | HDD-1 |
| 5 | 1 | 0 | |
| 6 | 0 | 1 | |
| 7 | 0 | 1 | |
| ⋮ | ⋮ | ⋮ | |
| 1000 | 0 | 1 | |
| 1001 | 0 | 1 | |
| 1002 | 0 | 1 | HDD-2 |
| ⋮ | ⋮ | ⋮ | |
| 2000 | 0 | 1 | |
| 2001 | 0 | 1 | |
| ⋮ | ⋮ | ⋮ | HDD-3 |
| 3000 | 0 | 1 | |

*Fig. 2B*

DATA STORAGE DEVICE AND DATA MANAGING METHOD

BACKGROUND OF THE INVENTION

1. Field of the Invention

The present invention relates to a data storage device comprising a plurality of discs connected in the form of array and its data managing method.

2. Description of the Related Art

In order to manage voluminous data in offices at high speed and a high level of reliability, data storage devices have been proposed to store data by dispersing in a plurality of disc drives in unit of, for instance, block with redundancy given to data to be stored. This technology has been disclosed in the U.S. Pat. No. 5,148,432 (Sep. 15, 1992) and "RAID Technology for Improving Failure Resistance and Reliability of Disks" in the April 1993 issue of "Interface". The RAID is an abbreviation of Redundant Arrays of Inexpensive Disks. These disks include magnetic disks that are used on hard disk drives, optical disks used on optical disk drives, floppy disks used on floppy disk drives, etc.

For instance, on a data storage device comprising four hard disk drives (HDD-1 through HDD-4), parity data for the same block data stored in the HDD-1 through the HDD-3 have been stored in the same block of the HDD-4. When the Nth block data of these HDDs are assumed to be A, B, C and D, respectively, the following relationship will hold good:

A XOR B XOR C=D (XOR denotes Exclusive OR)

Here, if the HDD-1 becomes faulty and a read error results, it is possible to restore the block data A by executing the operation of:

B XOR C XOR D

Further, when reading data, as HDDs storing corresponding block data can be simultaneously accessed, it will become possible to read data at high speed.

However, this system has such a problem that parity data must be always prepared and available in order to improve reliability and a time is needed for the process when writing data.

For instance, when writing data in Block A of the HDD-1, the following operations are needed:

(1) Read Block A (old data) of the HDD-1 for data.
(2) Read Block D (old parity) of the HDD-4 for parity.
(3) Execute the XOR operation between the read out Blocks A and D.
(4) Execute the XOR operation between new data and data obtained from the operation in (3) and prepare new parity data.
(5) Write new data into Block A of the HDD-1 for data.
(6) Write the new parity data prepared in (4) into Block D of the HDD-4.

As described above, read/write from/to the HDDs and the XOR operation are required twice, respectively and a considerable time is needed.

On a data storage device that manages files in unit of block according to the RAID system as described above, two times of file reading, XOR operation and file writing processes, respectively were required whenever file data were updated, and a considerable time was needed.

SUMMARY OF THE INVENTION

It is an object of the present invention to provide a data storage device capable of promoting speed of parity data generating process in file data writing and achieving data restoration process at a high speed when errors are produced in file data reading.

Another object of the present invention is to provide a file managing method for the data storage device.

According to the present invention, there is provided a data storage device comprising a plurality of data disks for storing data in units of data blocks, a parity disk for storing parity data used for restoring data to the data disks, first managing means for managing data blocks on the respective data disks with respect to whether each data block is used for data storage, second managing means for managing the data blocks on the respective data disks with respect to whether data of each data block is used for computing parity, detecting means, responsive to the first and second managing means, for detecting each data block which is not used for data storage and is used for computing parity, and purge processing means for updating the parity data based on data in the data blocks detected by the detecting means and the parity data stored to the parity disk corresponding to the detected data blocks.

Further, according to the present invention, there is provided a data storage device comprising a plurality of first storage media for storing file data in units of data blocks; a second storage medium for storing in parity blocks parity data corresponding to data stored in corresponding blocks in the respective first storage media; first flag storage means for storing first flag data showing whether each data block is used as a file data area; second flag storage means for storing second flag data showing whether each data block is used for computing parity; detecting means, responsive to the first and second flag storage means, for detecting each data block not used as a file data area and used for computing parity; purge processing means for updating the contents of the parity blocks based on data in the data blocks detected by the detecting means and the parity data in the parity blocks corresponding to the detected data block, and for toggling the second flag data for the detected data block; and parity data generating means for judging whether a selected one of the data blocks is not used for computing parity based on the second flag data when data is newly written in the selected data block, for updating the contents of the parity block corresponding to the selected block based on parity data of the parity block corresponding to the selected data block and data to be newly written to the selected data block, and for toggling the second flag data for the selected data block.

Furthermore, according to the present invention, there is provided a data managing method for a data storage device including a plurality of first storage media for storing file data in units of data blocks and second storage medium for storing in parity blocks parity data corresponding to data stored in corresponding blocks in the respective first storage media, comprising the steps of storing first flag data showing whether each data block is used as file data area; storing second flag data showing whether each data block is used for computing parity; detecting each data block not used as a file data area and used for computing parity; updating the contents of the parity blocks based on data in the detected data blocks and the parity data in the parity blocks corresponding to the detected data block, and toggling the second flag data for the detected data block; judging whether a selected one of the data blocks is not used for computing parity based on the second flag data when data is newly written in the selected data block; updating the contents of the parity block corresponding to the selected data block based on parity data of the parity block corresponding to the selected data block and data to be newly written to the selected data block; and toggling the second flag data for the selected data block.

DETAILED DESCRIPTION OF THE DRAWINGS

FIG. 2A is a diagram showing the construction of a file management table used for the disk array device shown in FIG. 1;

FIG. 2B is a diagram showing the construction of an array block management table used for the disk array device shown in FIG. 1;

DETAILED DESCRIPTION OF THE PREFERRED EMBODIMENT

Hereinafter, a preferred embodiment of the present invention will be described with reference to the drawings.

Figure 1:
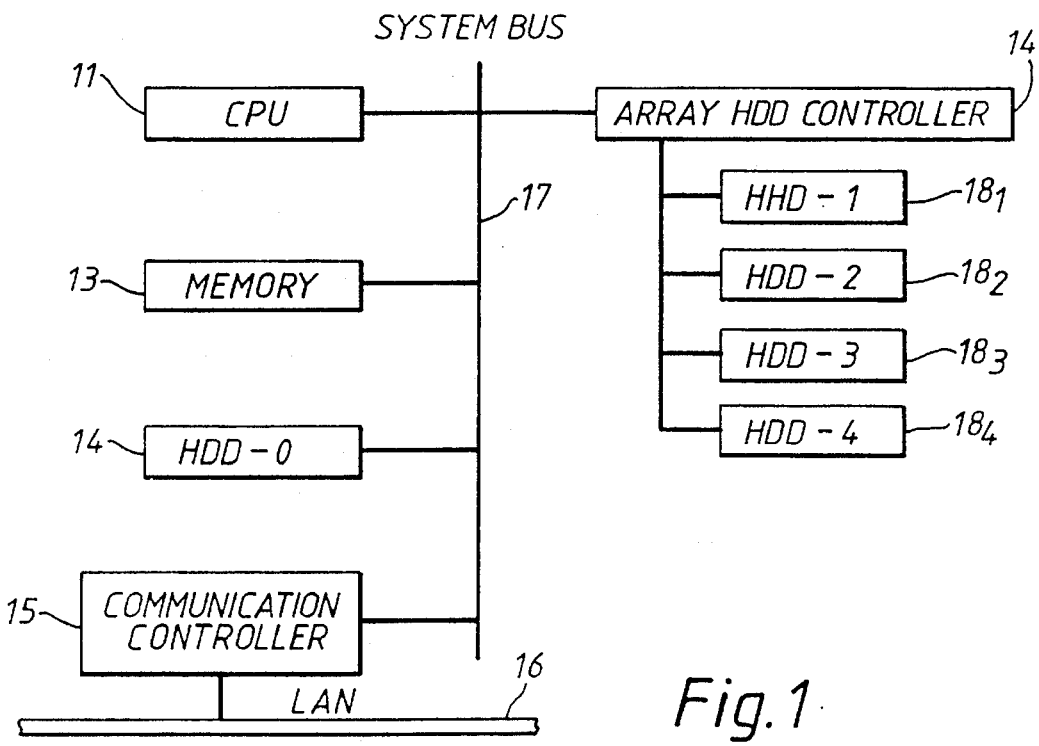
FIG. 1 is a system configuration diagram of a disk array device in one embodiment of a data storage device of the present invention.

FIG. 1 is a system configuration diagram of the disk array device in one embodiment relative to the data storage device of the present invention. In FIG. 1, the reference number 11 denotes a CPU that controls the entire data storage device. The CPU 11 reads out a program stored in the HDD-0 (12) and controls all the parts of the device according to the contents of this program. The reference number 14 denotes an array HDD controller. The array HDD controller 14 controls 4 units of HDD-1 through HDD-4 ($18_1$-$18_4$). The HDD-1 through HDD-4 ($18_1$-$18_4$) store and reproduce file data with parity data added. 3 units of the HDD-1 through HDD-3 ($18_1$-$18_4$) out of 4 units of the HDD are used for data while the HDD-4 ($18_4$) is used for parity. Data obtained from the XOR operation of block data of the same block number in 3 units of the HDD-1 through HDD-3 ($18_1$-$18_3$) have been stored in the block having the same block number of the HDD-4 ($18_4$) for parity.

Size of the HDD block of this data storage device is 1,024 bytes and the data storage device has a storage capacity of 1,000 blocks per unit. Total physical number of blocks of 4 units of the HDD-1 to HDD-4 ($18_1$-$18_4$) is 4,000 blocks. However, as one unit of the HDD is for parity, the total number of blocks for storing file data are actually 3,000 blocks. Reference number 15 denotes a communication controller, which receives commands sent through a LAN 16 and transmits the processed result to other terminal equipment through the LAN 16. All parts excepting the HDD-1 to HDD-4 are connected each other through a system bus 17.

FIGS. 2A and 2B are the diagrams showing the constructions of the management tables for managing the data storage device of the present invention.

As the management tables, a file management table 21 (FIG. 22A) and an array block management table 22 (FIG. 2B) are used. These management tables 21 and 22 have been stored in the HDD-0 (12).

As shown in FIG. 2A, the file management table 21 comprises File No. ("1" to "100") 21a, Existence Flag ("1" denotes existence, "0" denotes non-existence) 21b, Using Blocks for File Data 21c, and Block No. in Array HDD storing file data (called Array Block No.) 21d, and is in construction capable of managing max. 100 files.

The Array Block Number 21d uses values from "1" to "3000". "1" to "1000" correspond to Block Nos. "1" to "1000" of the HDD-1 (181), "1001" to "2000" correspond to Block Nos. "1" to "1000" of the HDD-2 ($18_2$), and "2001" to "3000" correspond to Block Nos. "1" to "1000" of the HDD-3 ($18_3$).

As shown in FIG. 2B, the array block management table 22 comprises Array Block No. ("1" to "3000") 22a, Use Flag 22b to show whether the array blocks are used as the file data areas, and Clear Flag 22c to show whether data in the array blocks are all "0".

When the value is "1", the use flag 22b shows that the array block is in use. When the value is "1", the clear flag 22c shows that data are all "0" (cleared).

In the example shown in FIG. 2A, when the File No. 21a is "1", the number of using blocks for file data is "3", the array block numbers storing data are "1", "2" and "3". The Array Block Nos. "1", "2" and "3" correspond to Block Nos. "1", "2" and "3" of the HDD-1 ($18_1$). Further, as these array blocks are used as the file data areas, the use flags 22b for these blocks have been set at "1". In addition, the clear flags 22c for these array blocks have been set at "0" and it is seen that all data are not "0". Further, the use flag 22b for Array Block No. 6 has been set at "0" and this array block is not used as the file data area. The clear flag 22c has been set at "1" and it is seen that data in this array block are all "0".

Next, the operation in this embodiment will now be described.

Figure 3:
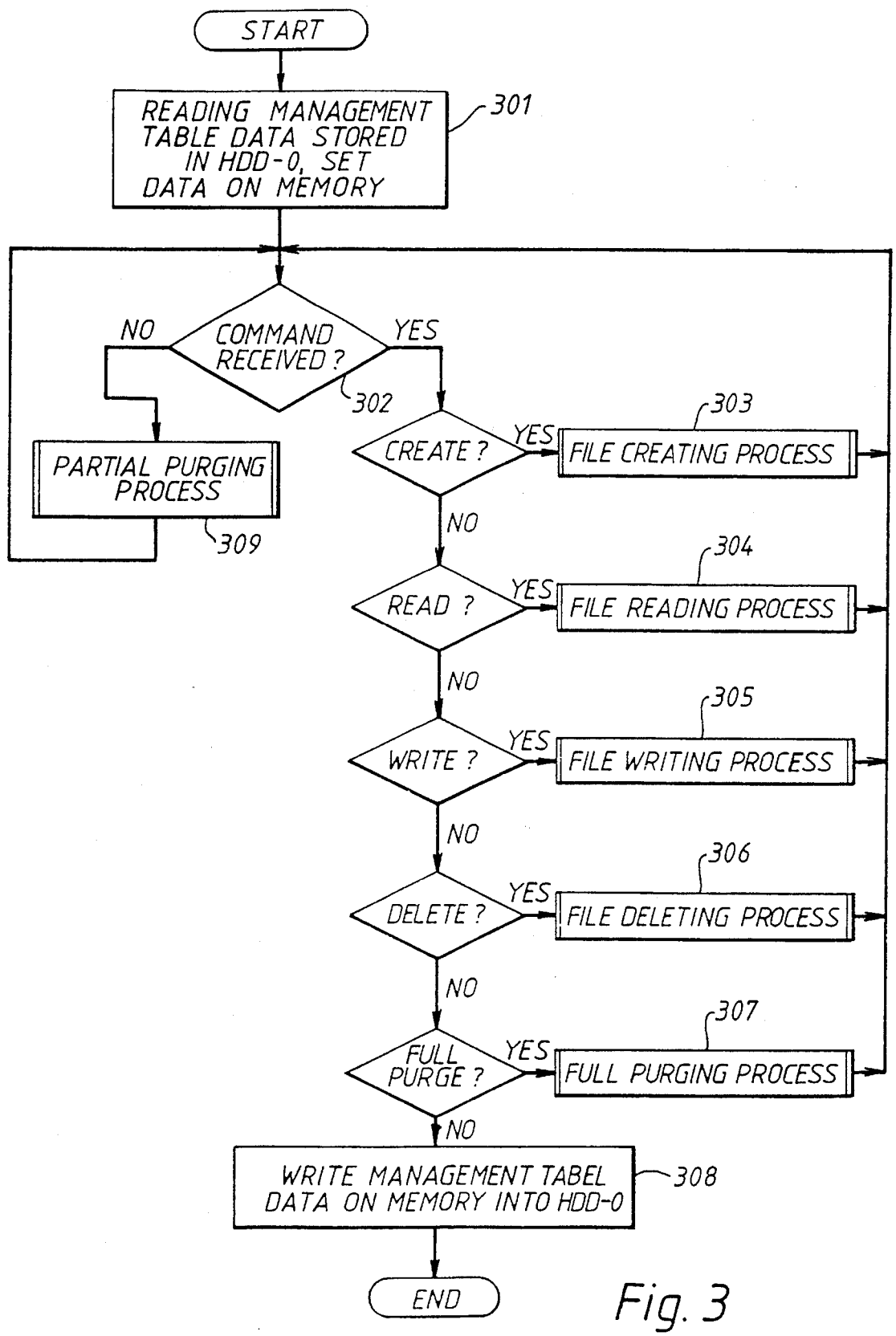
FIG. 3 is a flowchart showing the whole process steps of the disk array device shown in FIG. 1.

FIG. 3 is a flowchart showing the processing steps of the entire data storage device of the present invention.

First, the CPU 11 reads data out of the file management table 21 and the array block management table 22 stored in the HDD-0 (12) and set them on the memory 13 (Step 301).

Thereafter, the CPU 11 checks whether a command has been received from a terminal equipment connected to the LAN 16 through the communication controller 15 (Step 302).

When a command has been received, the CPU 11 executes the file creating process (Step 303), the file reading process (Step 304), the file writing process (Step 305), the file deleting process (Step 306) and full purging process (Step 307), respectively according to the received command, and returns to Step 302 to check whether a command has been received again. If the command receiving was completed, the CPU 11 writes data of the management tables 21 and 22 on the memory 13 into the HDD-0 (12) (Step 308) and terminates the process.

In Step 302, if no command was received, the CPU 11 executes the partial purging process (Step 309) and returns to Step 302 to check again if there is any command received.

Figure 4:
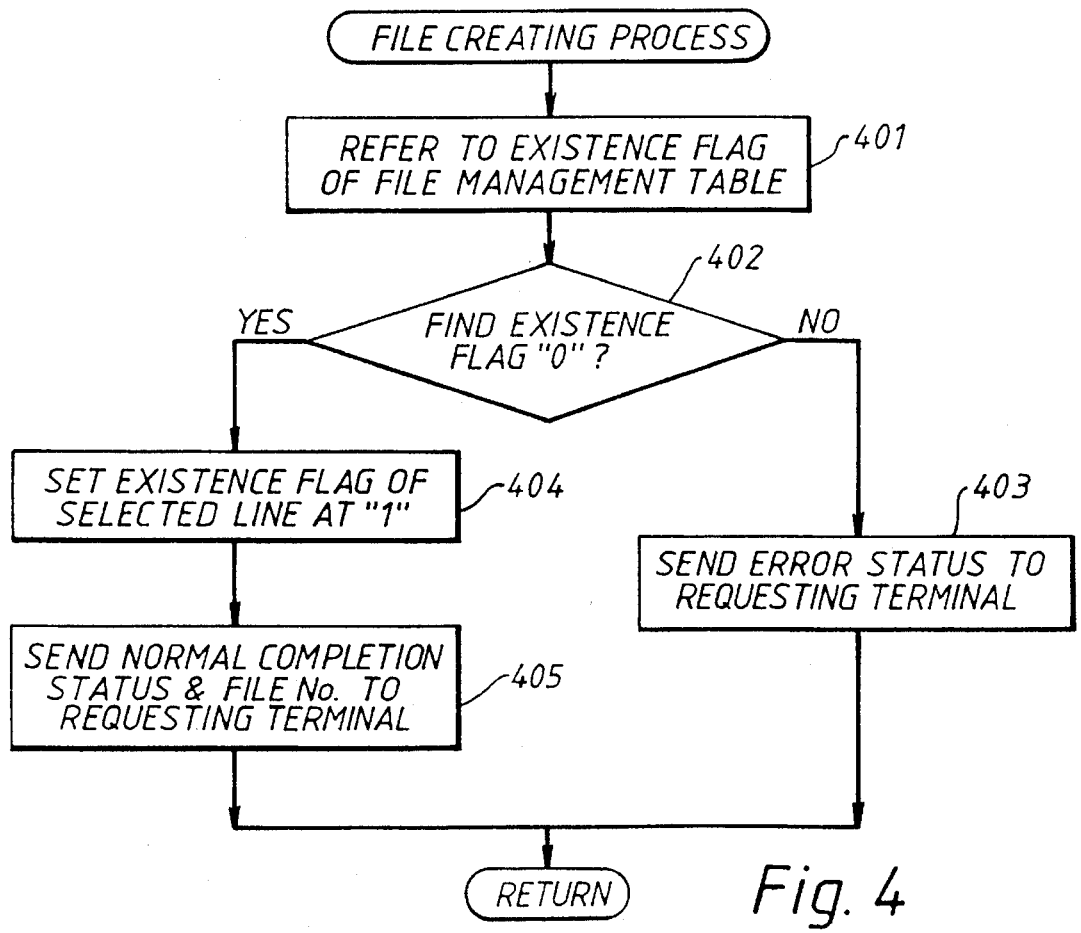
FIG. 4 is a flowchart showing the file preparation processing steps.

FIG. 4 is a flowchart showing the steps of the file creating processing step 303.

In the file creating process, the CPU 11 first refers to the existence flag 21b for each line of the file management table 21 (Step 401). In succession, the CPU 11 checks if the existence flag "0" is found (Step 402). If the existence flag "0" couldn t be found, the file management table 21 was full and the CPU 11 sends an error status to the requesting terminal equipment (Step 403). When the existence flag "0" has been found, the CPU 11 sets the existence flag 21b for the line where "0" has been found at "1" (Step 404), sends the status showing the proper completion of the processes and File No. of the line for which the existence flag has been set from "0" to "1" to the requesting terminal equipment (Step 405), and returns to Step 302.

For instance, when the file creating process was executed in the state of the file management table 21 shown in FIG. 2A, File No. "3" is selected, its existence flag 21b is set at "1" and File No. "3" is sent to the requesting terminal equipment.

Figure 5:
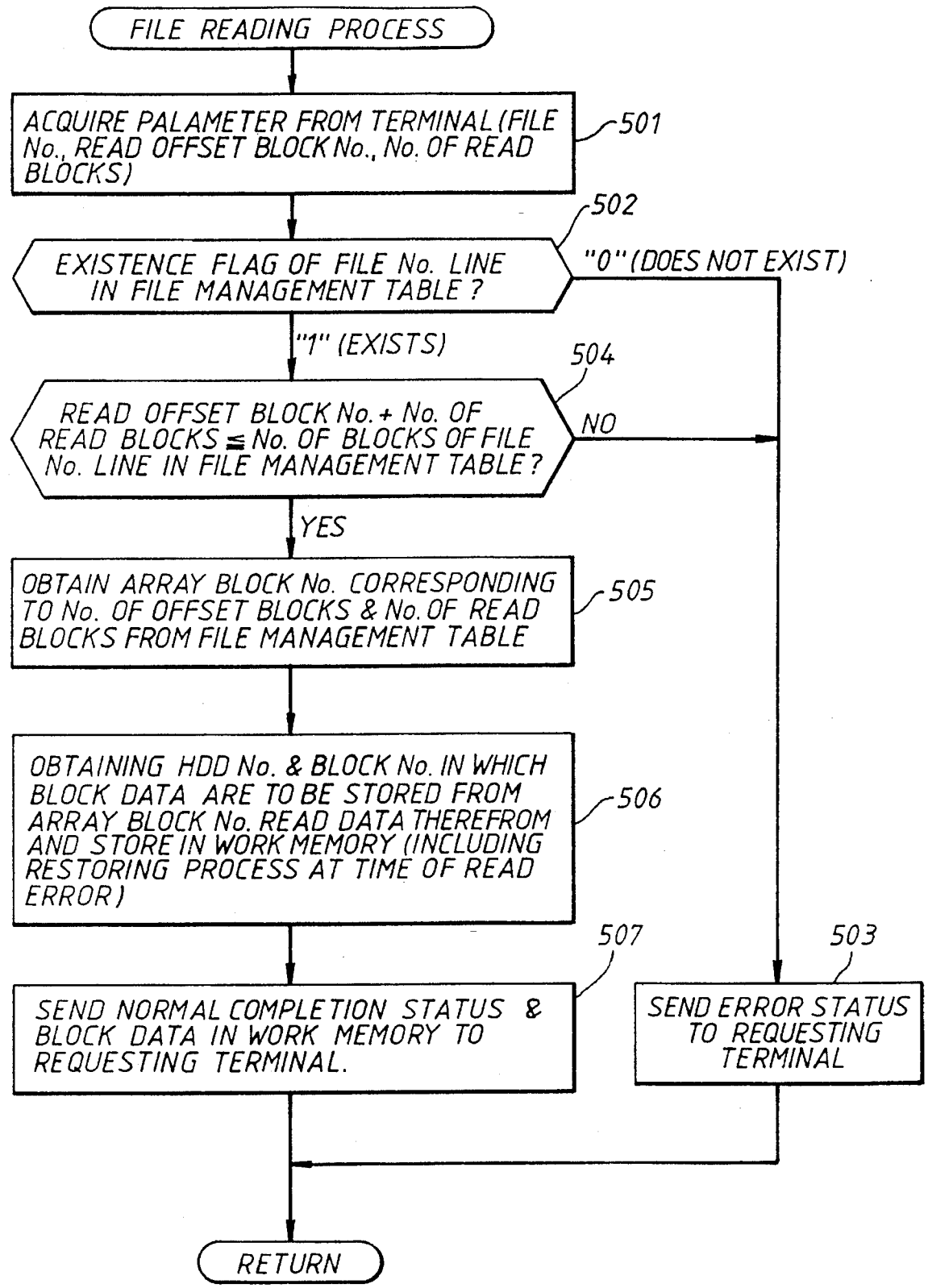
FIG. 5 is a flowchart showing the file read-out processing steps.

FIG. 5 is a flowchart showing the steps of the file reading processing step 304.

In the file reading process, the CPU 11 first obtains a parameter from a terminal equipment through the communication controller 15 (Step 501). The parameter comprises File No., Read Offset Block No. and Number of Read-out Blocks. This parameter indicates the read-out of block data in numbers expressed by the number of read-out blocks from a block at the position expressed by the Read Offset Block Number of a file specified by File No. Data are read in unit of block between a terminal equipment and this data storage device and the process in unit of byte in a block is executed at the terminal equipment side.

Next, to check whether there is a file specified by the parameter, the CPU 11 refers to the existence flag 21b for a file number line in the file management table 21 (Step 502). The existence flag 21b being "1" indicates that there exists the file specified by the parameter and therefore, the CPU 11 proceeds to the next step. The existence flag being "0" indicates that the file specified by the parameter does not exist and therefore, the CPU 11 sends an error status to a requesting terminal equipment through the communication controller 15 (Step 503) and returns to Step 302.

Then, in order to check whether the read requested block specified by the parameter is within a file size, the CPU 11 compares "Read Offset Block No.+No. of Read Blocks" with "No. of File Blocks" (Step 504). When "No. of File Blocks" is larger than or equal to "Read Offset Block No.+ No. of Read Blocks", the request is within the file size and therefore, the CPU 11 proceeds to the next step 505. In another case, as the request is over the file size, the CPU 11 sends an error status to the requesting terminal equipment through the communication controller 15 (Step 503) and returns to Step 302.

When "No. of File Blocks" is larger than or equal to "Read Offset Block NO."+No. of Read Blocks", as the request is within the file size, the array block number corresponding to an area specified by the parameter is obtained from the array block numbers of the file number line of the file management table 21 (Step 505).

For instance, in case of a parameter comprising File No."1", Read Offset Block No."1" and No. of Read Blocks "2", the corresponding Array Block Nos. are "2" and "3" when the file management table 21 is referred to.

Further, in case of a parameter comprising File No. "2", Read Offset Block No. "1" and No. of Read Blocks "2", the read requested block is over the file size and therefore, an error will result.

Next, the CPU 11 obtains the HDD Nos. (HDD-1 to HDD-3) and Block Nos. actually storing block data from the Array Block Nos. obtained in Step 505 and then, based on these HDD Nos. and Block Nos., reads data out of the prescribed address positions of the HDDs corresponding to the HDD Nos. and stores this data in the memory 13 (Step 506). At this time if a read error results in the HDDs, the CPU 11 reads data from the parity HDD-4 ($18_4$) and other data HDDs and based on these data, restores error data. For instance, if Array Block Nos. are "2" and "3", the CPU 11 reads block data from data stored in Block Nos. "2" and "3" of the HDD-1 (18).

Thereafter, the CPU 11 sends a status indicating the proper completion and block data stored in the memory 13 to the requesting terminal equipment through the communication controller 15 (Step 507) and returns to Step 302.

Figure 6:
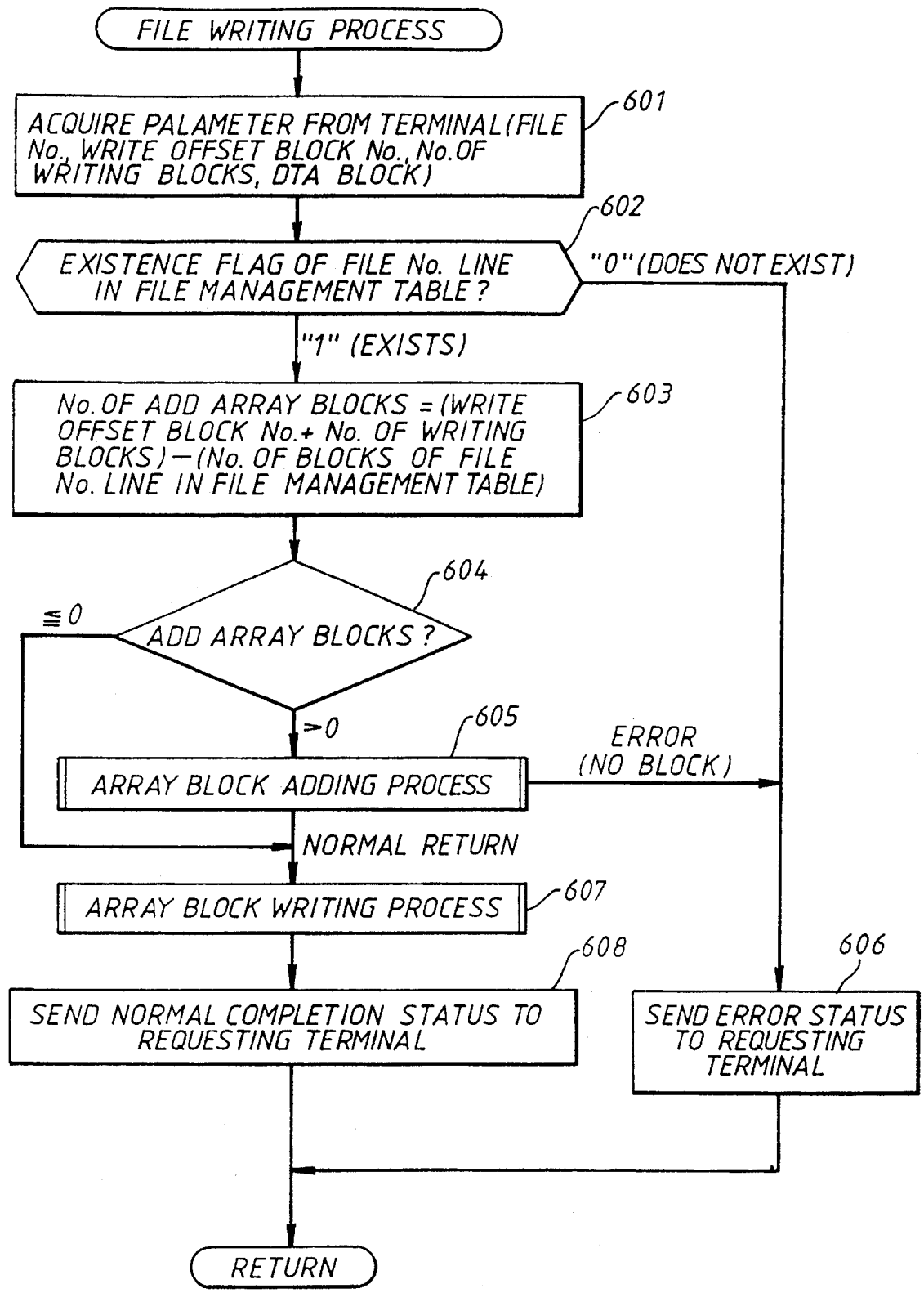
FIG. 6 is a flowchart showing the file write processing steps.

FIG. 6 is a flowchart showing the steps of the file writing process step 305.

First, the CPU 11 gets a parameter from a terminal equipment through the communication controller 15 (Step 601). This parameter comprises File No., Write Offset Block No., No. of Writing Blocks and data blocks. This parameter indicates to write block data in number expressed by the number of writing blocks from the block at the position shown by the write offset block number of the file specified by a file number.

Next, the CPU 11 checks whether there exists the file specified by the parameter likewise the file reading process (Step 602).

Figure 7:
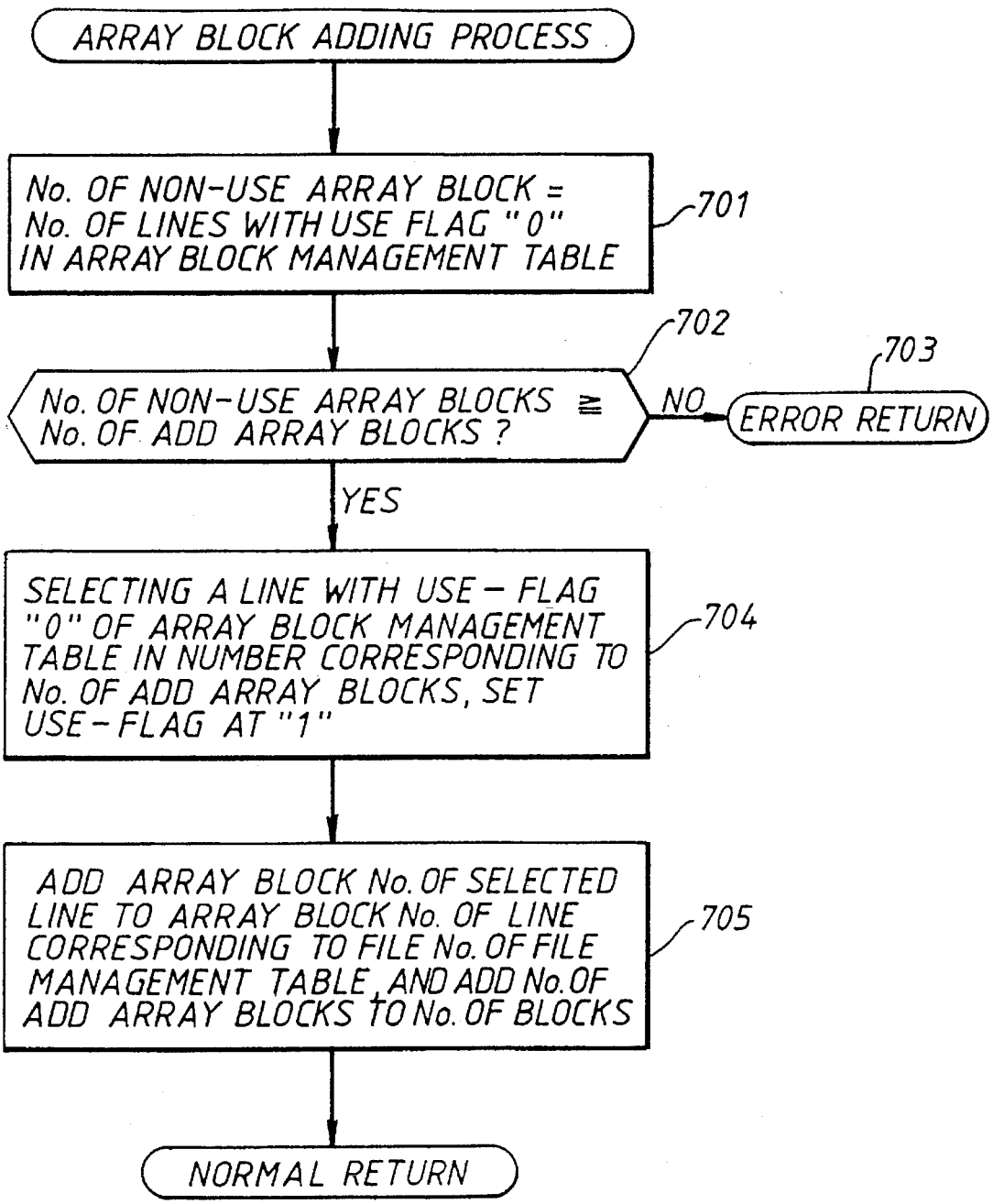
FIG. 7 is a flowchart showing the array block adding processing steps.

Then, in order to check whether the write requesting block specified by the parameter is within a file size, the CPU 11 obtains the number of additional array blocks from an equation: [Write Offset Block No.+No. of Write Blocks]−[No. of File Blocks] (Step 603). Then, the CPU 11 checks whether the number of additional array blocks is larger than "0" (Step 604). If the number of additional array blocks is larger than "0", it is necessary to add a data area block and therefore, the array block adding process shown in FIG. 7 is executed (Step 605). If error returned from this array block adding process, the array block becomes short and therefore, the CPU 11 sends an error status to the requesting terminal equipment through the communication controller 15 (Step 606) and returns to Step 302. If the number of additional blocks is less than "0", as data are to be written into the existing data block, the CPU 11 skips the array block adding process step 605.

Thereafter, the CPU 11 executes the array block writing process for the array blocks in the area specified by the parameter (Step 607).

Then, the CPU 11 sends a status indicating the proper completion and block data stored in the memory 13 to the requesting terminal equipment through the communication controller 15 (Step 608) and returns to Step 302.

FIG. 7 is a flowchart showing the steps of the array block adding process step 605.

First, the CPU 11 obtains the number of lines of which use flags 22b in the array block management table 22 are "0" (non-use) and sets it as a variable of the number of non-use array blocks (Step 701). When this number of non-use array blocks is less than the number of additional array blocks obtained in Step 603 (Step 702), the array blocks are short and the CPU 11 makes the error return (Step 703). When the number of non-use array blocks is over the number of additional array blocks, the CPU 11 selects the lines in number corresponding to additional array blocks, of which use flags 22b in the array block management table 22 are "0"

and sets the use flags 22b for the array block numbers at "1" (Step 704). The CPU 11 adds the array block numbers of the selected lines to the array block number 21d of the file number line specified by the file management table 21 and after adding the number of adding array blocks to the block numbers 21c (Step 705), returns properly.

For instance, in case of a parameter comprising File No. "2", Write Offset Block No. "1" and No. of Write Blocks "2", the number of additional array blocks will be (1+2)–2=1 block. Accordingly, Array Block Number "6" of the 6th line of which use flag 22b of the array block management table 22 is "0" is selected and this use flag 22b is set at Then, the number of blocks of the line of which File No. 21a in the file management table 21 is "2" is changed from "2" to "3" and "6" is added to the array block number 21d. As a result, "4", "5" and "6" are set for the array block number 21d.

Figure 8:
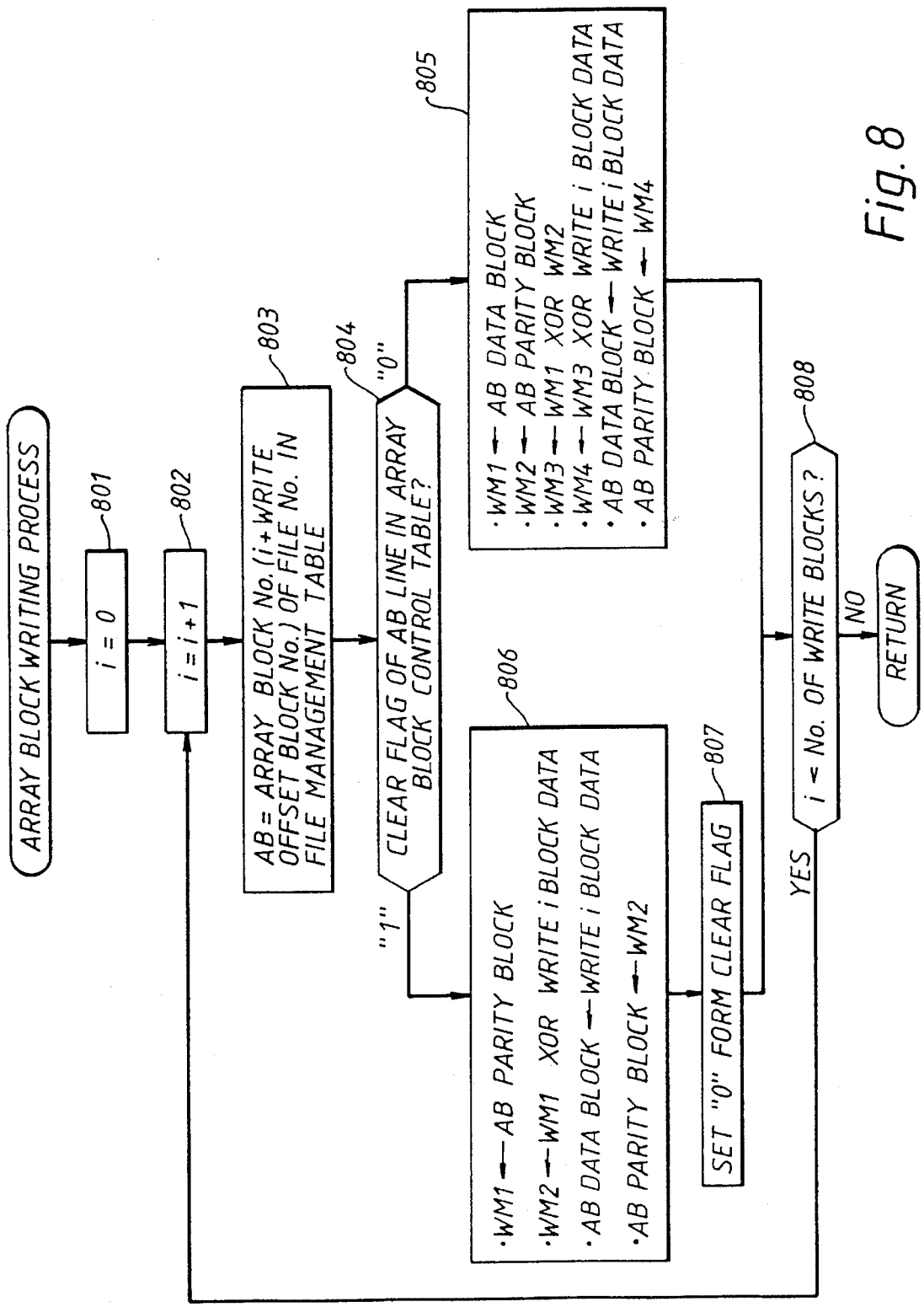
FIG. 8 is a flowchart showing the array block write processing steps.

FIG. 8 is a flowchart showing the steps of the array block writing step 607.

In this array block writing process, assuming a variable "i" as showing Data Block No. in a parameter, the writing process is executed for each block while setting the number of write blocks starting from "1" (Steps 802, 808). When the same parameter as that shown above is specified, "1" and "2" are set sequentially for "i".

Then, the following process is executed for Data Block No. "i" in the parameter:

First, the CPU 11 obtains a value of [i+Write Offset Block No. in Parameter] of Array Block No. 21d of the file number line in the file management table 21 and then, set it as a variable "AB" (Step 803). Data is written for the array block shown by this variable "AB". For instance, when a parameter is the same as above, Array Block Nos. are the second and third array block numbers of file No. "2" and therefore, "5" and "6" are set sequentially for the variable AB.

Then, the CPU 11, referring to the array block clear flag 22c (Step 804) shown by the variable "AB" in the array block management table 22, executes the following 6 steps (Step 805) if the value of the flag is "0" (uncleared).

(1) From the value shown by the variable "AB", by reading the block data of the HDD storing the corresponding data block, stores the data in the work memory area 1 (WM1) in the memory 13.

(2) From the value shown by the variable "AB", by reading the block data of the HDD storing the corresponding parity block, stores the data in the work memory area 2 (WM2).

(3) Executes the XOR operation between data in the WM1 and the WM2 and stores the result of operating in the work memory area 3 (WM3) in the memory 13.

(4) Executes the XOR operation between data in the WM3 and the "i"th block in the parameter and stores the result of operating in the work memory area 4 (WM4) in the memory 13.

(5) Writes the "i"th block data in the parameter into the data HDD block shown by the variable "AB".

(6) Writes data in the WM4 into the parity HDD-4 ($18_4$) block shown by the variable "AB".

Further, if the value of the clear flag 22c is "1" (Cleared), the CPU 11 executes the following process in 4 steps (Step 806):

(1) From a value shown by the variable "AB", reads the block data of the HDD storing the corresponding parity block and stores in the work memory area 1 (WM1) in the memory 13.

(2) Executing the XOR Operation between the data in the WM1 and the "i"th block data in the parameter, stores the result of operation in the work memory area 2 (WM2) in the memory 13.

(3) Writes data of the "i"th block in the parameter into the data HDD block shown by the variable "AB".

(4) Writes the data in WM2 into the block of the parity HDD-4 ($18_4$) shown by the variable "AE".

Thereafter, the CPU 11 sets "0" for the clear flag 22c of the array block in the array block management table 22 into which data have been written (Step 807). That is, the value "1" of the clear flag 22c is toggled to "0".

For instance, when the same parameter as above has been specified, data are written for the array block numbers "5" and "6" and the processes comprising 6 steps are executed as the clear flag 22c for Array Block No. "5" is "0" and the processes comprising 4 steps are executed as the clear flag 22c for Array Block No. "6" is "1". Thus, there is such a merit that if data in the writing block are all "0", the number of processing steps is less and the number of work memory areas to be used is also less.

Figure 9:
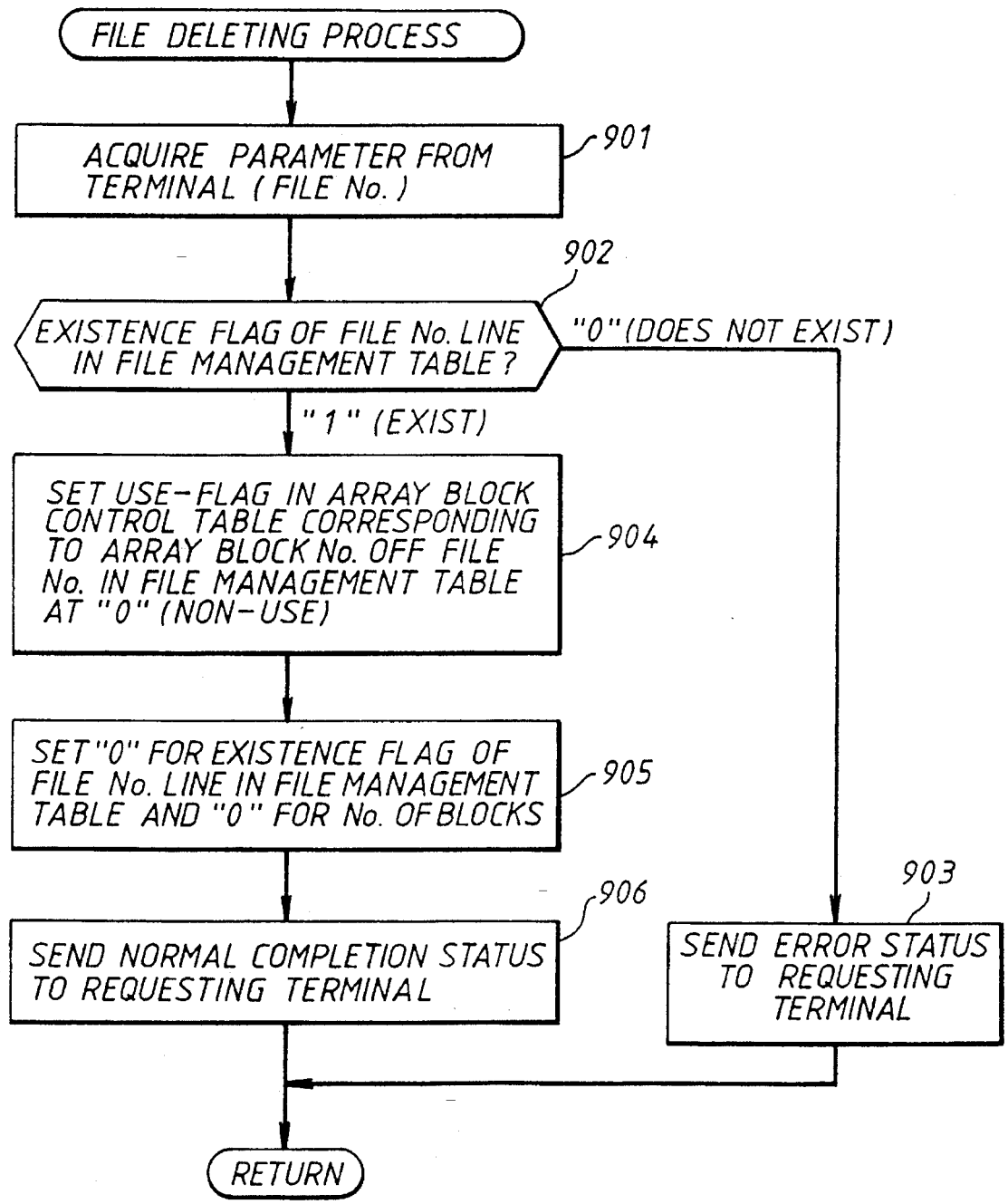
FIG. 9 is a flowchart showing the file delete processing steps.

FIG. 9 is a flowchart showing the steps of the file deleting process step 306.

In the file deleting process, first, the CPU 11 acquires a parameter from a terminal equipment through the communication controller 15 (Step 901). The parameter comprises File No.

Then, likewise the file reading process, the CPU 11 checks whether there is a file specified by the parameter (Step 902). When the file does not exist, the CPU 11 sends an error status to the requesting terminal equipment (Step 903) and returns to Step 302.

When there is the file, the CPU 11 obtains Array Block No. assigned for the file data from the file management table 21 and sets the corresponding use flag 22b in the array block management table 22 at "0" (non-use) (Step 904).

Then, the CPU 11 sets "0" (non-existence) for the file number line existence flag 21b in the file management table 21, "0" for the number of blocks 21c (Step 905) and lastly, sends a status showing the proper completion to the requesting terminal equipment (Step 906), and returns to Step 302.

For instance, when the deletion of File No. "1" is specified, the array blocks with Array Block Nos. "1", "2" and "3" are released and their use flags 22b become "0".

Figure 10:
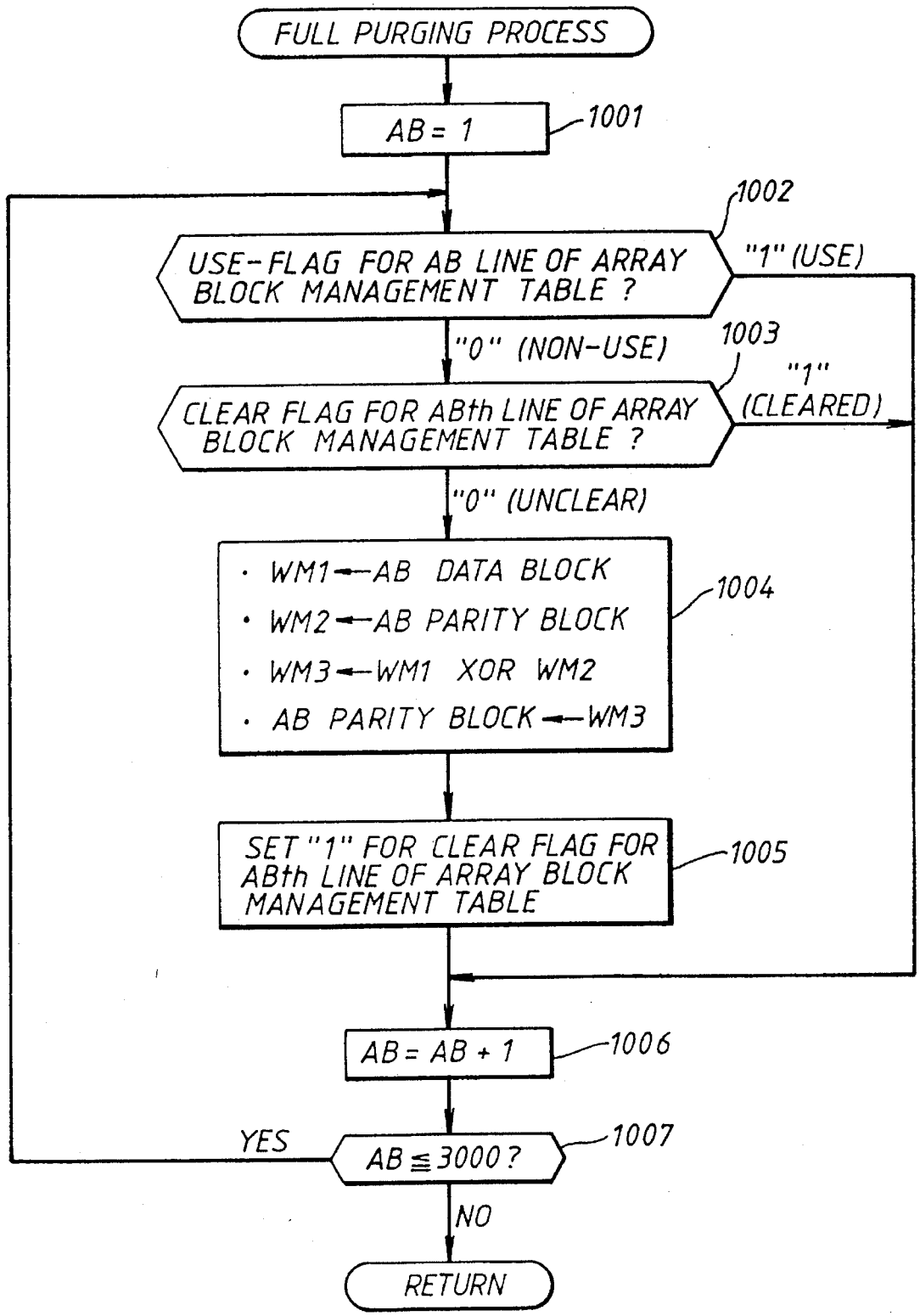
FIG. 10 is a flowchart showing the whole purge processing steps.

Under the state immediately after deleting files, the clear flags 22c for these array blocks are left at "0". If these array blocks are added as the file data areas and data are written thereto, the process step becomes 6 as in the conventional example, causing deterioration of performance. So, when a process to clear data in the array blocks of which use flags 22b are "0" (non-use) and the clear flags 22c are "0" (uncleared) is carried out according to circumstances (this process will be referred to as the purging process), it becomes possible to reduce the writing process requiring 6 steps to 4. FIG. 10 is a flowchart showing the steps of the full purging process step 307.

This full purging process is to purge all array blocks in the non-use and uncleared state in the system according to a request from a terminal equipment. This request is made when access to the system is less, for instance, during the nighttime or when starting up the system or immediately before stopping the system.

The CPU 11 sets the array block numbers ranging from "1" to "3000" sequentially for a variable "AB" (Step 1001) and executes the following processes for each array block.

First, the CPU 11 refers to the use-flag 22b for the array block shown by the variable "AB" from the array block management table 22 (Step 1002) and when the value of this flag is "1" (use), proceeds to the next array block.

Further, when the value of the use flag 22b is "0" (non-use), the CPU 11 refers to the clear flag 22c (Step 1003) and if the value of the clear flag 22c is "1" (cleared), proceeds to the next array block.

Then, the CPU 11 executes the following processes for the array blocks of which use flags 22b are "0" (non-use) and the clear flags 22c are "0" (uncleared) (Step 1004).

(1) From a value shown by the variable "AB", reads block data of the HDD storing the corresponding data block and stores in the work memory 1 (WM1).

(2) From a value shown by the variable "AB", reads block data of the HDD-4 ($18_4$) storing the corresponding parity block and stores in the work memory 2 (WM2).

(3) Executes the XOR operation between data in the WM1 and WM2 and stores the result of operation in the work memory 3 (WM3).

(4) Writes data in the WM3 into the parity HDD-4 block ($18_4$) shown by the variable "AB".

Then, set "1" (cleared) for the corresponding clear flag 22c of the array block management table 22 (Step 1005), that is, the value "0" of the clear flag 22c is toggled to "1", and proceeds to the next array block.

Figure 11:
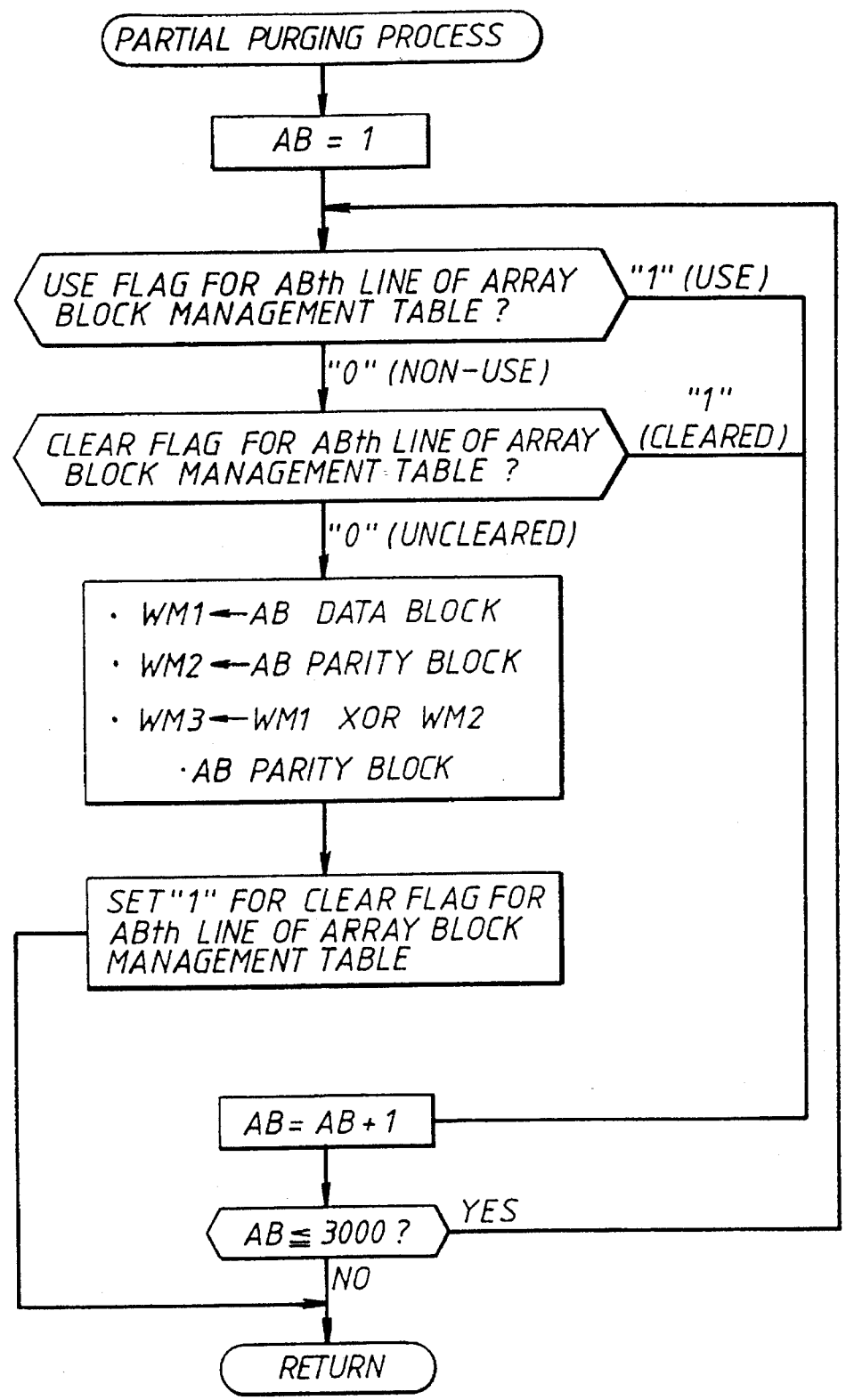
FIG. 11 is a flowchart showing the partial purge processing steps.

FIG. 11 is a flowchart showing the steps of the partial purging process step 309.

This partial purging process is to purge the array blocks in the non-use and uncleared state by one block at a time when there is no request from any terminal equipment.

This process is almost the same as the full purging process shown in FIG. 10 but differs in that the CPU 11 does not execute the purging process for all array blocks but selecting any one array block in non-use and uncleared state, executes the purging process for only that array block and then, returns to Step 302.

In the full and partial purging processes, all "0" data were not written for a data block of the array blocks which were set as cleared. This is because data that were assumed to be "0" in the data block have been written in the corresponding parity block. Because of this, when restoring data by reading the same block of other HDD at the time of HDD reading error, it becomes also possible to omit a process to read a block of which clear flag 22c is "1".

Figure 12:
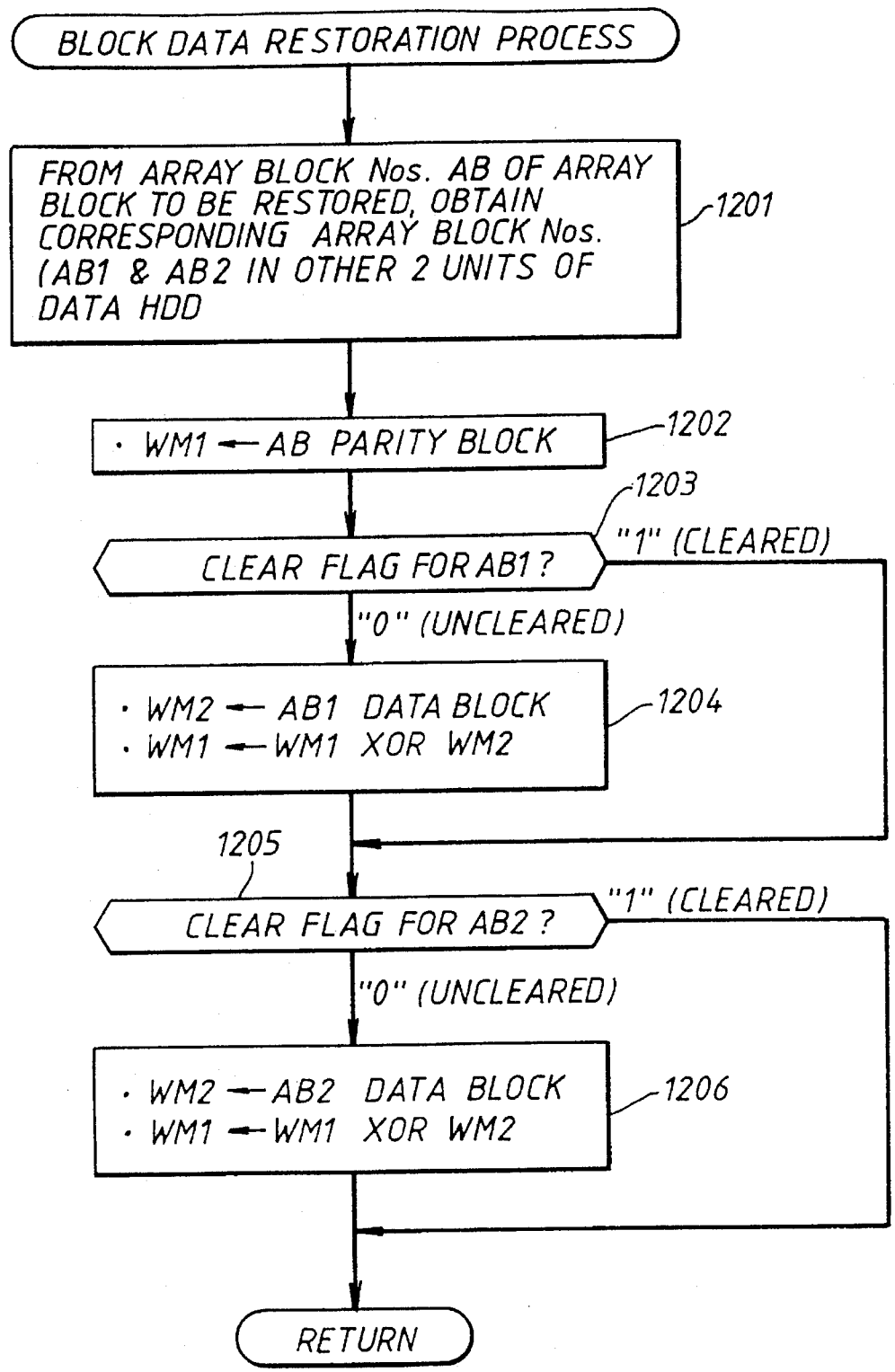
FIG. 12 is a flowchart showing the block data restoration processing steps.

FIG. 12 is a flowchart showing the block data restoring process steps.

This process is carried out when the data block reading error was taken place.

First, from the array block number ("AB") of the array block to be restored, the corresponding array block number in other 2 units of the data HDD is obtained and set for "AB1" and "AB2" (Step 1201). For instance, Array Block Nos. "1001" and "2001" are obtained for Array Block No. "1".

Then, the parity block of the array block "AB" is read and stored in the work memory 1 (WM1) (Step 1202). For instance, the first block of the HDD-4 ($18_4$) is read out for Array Block No. "1".

Then, the clear flag 22c of the array block "AB1", which is another data block in the array block management table 22 is referred to (Step 1203) and when the value of this flag is "0" (uncleared), the following processes are executed (Step 1204) by the CPU 11.

(1) Reads the data block of the array block "AB1" and stores in the work memory 2 (WM2).

(2) Executes the XOR operation between data in the WM1 and WM2 and stores the result of operation in the WM1.

When the clear flag 22c is "1" (cleared), the above processes are skipped.

Then, the similar processes are carried out for the array block "AB2" (Step 1205 and 1205).

Restored data is generated in the WM1 by these processes. For instance, when an error is generated when reading data in a block with Array Block No. "1" and data in the block is to be restored in the state of the array block management table 22 as shown in FIG. 2B, the data can be restored only when reading the first block data in the HDD-4 ($18_4$) as the clear flags 22c for corresponding array blocks ("1001" and "2001") in other HDD-2 ($18_2$) and HDD-3 ($18_3$) are both "1". That is, it becomes also possible to execute the data restoration process at a high speed.

As described above, according to the data storage device and its file managing method of the present invention, when data in a data block which is no longer used are cleared in advance, the parity data generating process when writing data in this data block can be made only by executing the exclusive OR operation of write data and parity data and thus, the process speed can be sharply promoted.

Further, the data restoration process when an error is generated while reading data from a certain data block can be made only by executing the exclusive OR operation of the uncleared data block data and parity data, and the data restoration process can be accelerated.

What is claimed is:

1. A data storage device comprising:

a plurality of data disks for storing data in units of data blocks;

a parity disk for storing parity data used for restoring data to the data disks;

first managing means for managing data blocks on the respective data disks with respect to whether each data block is used for data storage;

second managing means for managing the data blocks on the respective data disks with respect to whether data of each data block is used for computing parity;

detecting means, responsive to the first and second managing means, for detecting each data block which is not used for data storage and is used for computing parity; and purge processing means for updating the parity data based on data in the data blocks detected by the detecting means and the parity data stored to the parity disk corresponding to the detected data blocks.

2. A device according to claim 1, wherein the first managing means includes first flag storage means for storing first flag information representing whether each data block on the respective data disks is used for data storage.

3. A device according to claim 1, wherein the second managing means includes second flag storage means for storing second flag information representing whether data of each data block is used for computing parity.

4. A device according to claim 1 further comprising means for further updating the parity data stored to the parity disk based on the parity data and data newly written to a selected data block when, prior to newly writing, the selected data block is not used for data storage and not used for computing parity.

5. A data storage device comprising:

a plurality of first storage media for storing file data in units of data blocks;

a second storage medium for storing in parity blocks parity data corresponding to data stored in corresponding blocks in the respective first storage media;

first flag storage means for storing first flag data showing whether each data block is used as a file data area;

second flag storage means for storing second flag data showing whether each data block is used for computing parity;

detecting means, responsive to the first and second flag storage means, for detecting each data block not used as a file data area and used for computing parity;

purge processing means for updating the contents of the parity blocks based on data in the data blocks detected by the detecting means and the parity data in the parity blocks corresponding to the detected data block, and for toggling the second flag data for the detected data block; and parity data generating means for judging whether a selected one of the data blocks is not used for computing parity based on the second flag data when data is newly written in the selected data block, for updating the contents of the parity block corresponding to the selected data block based on parity data of the parity block corresponding to the selected data block and data to be newly written to the selected data block, and for toggling the second flag data for the selected data block.

6. A device according to claim 5, further comprising:

access detecting means for detecting presence of a request for accessing files; and means for starting the purge processing means when the access detecting means detects an absence of a file accessing request.

7. A data storage device comprising:

a plurality of first storage media for storing file data in units of data blocks;

a second storage medium for storing in parity blocks parity data corresponding to data stored in corresponding blocks in the respective first storage media;

first flag storage means for storing first flag data showing whether each data block is used as a file data area;

second flag storage means for storing second flag data showing whether each data block is used for computing parity;

detecting means, responsive to the first and second flag storage means, for detecting each data block not used as a file data area and used for computing parity;

purge processing means for updating the contents of the parity blocks based on data in the data blocks detected by the detecting means and the parity data in the parity blocks corresponding to the detected data block, and for toggling the second flag data for the detected data block; and data restoration means for restoring data in a selected one of the data blocks of a selected one of the first storage media based on parity data in the parity block corresponding to the selected data block and data in the corresponding data block on a non-selected one of the first storage media which is used for computing parity.

8. A device according to claim 7, further comprising:

access detecting means for detecting presence of a request for accessing files; and means for starting the purge processing means when the access detecting means detects an absence of a file accessing request.

9. A device according to claim 7, wherein the data restoration means includes XOR operating means for executing an exclusive OR (XOR) operation between parity data in the parity block corresponding to the selected data block and data in the corresponding data block on the non-selected one of the first storage media.

10. A data managing method for a data storage device including a plurality of first storage media for storing file data in units of data blocks and second storage medium for storing in parity blocks parity data corresponding to data stored in corresponding blocks in the respective first storage media, comprising the steps of:

storing first flag data showing whether each data block is used as a file data area;

storing second flag data showing whether each data block is used for computing parity;

detecting each data block not used as a file data area and used for computing parity;

updating the contents of the parity blocks based on data in the detected data blocks and the parity data in the parity blocks corresponding to the detected data block, and toggling the second flag data for the detected data block;

judging whether a selected one of the data blocks is not used for computing parity based on the second flag data when data is newly written in the selected data block;

updating the contents of the parity block corresponding to the selected data block based on parity data of the parity block corresponding to the selected data block and data to be newly written to the selected data block; and toggling the second flag data for the selected data block.

11. A method according to claim 10, further comprising:

detecting presence of a request for accessing files; and starting the purging step when the access detecting step detects an absence of a file accessing request.

12. A data managing method of a data storage device, including a plurality of first storage media for storing file data in units of data blocks and second storage medium for storing in parity blocks parity data corresponding to data stored in corresponding blocks in the respective first storage media, comprising the steps of:

storing first flag data showing whether each data block is used as a file data area;

storing second flag data showing whether each data block is used for computing parity;

detecting each data block not used as a file data area and used for computing parity;

updating the contents of the parity blocks based on data in the detected data blocks and the parity data in the parity blocks corresponding to the detected data block, and toggling the second flag data for the detected data block;

restoring data in a selected one of the data blocks of a selected one of the first storage media based on parity data in the parity block corresponding to the selected data block and data in the corresponding data block on a non-selected one of the first storage media which is used for computing parity.

13. A method according to claim 12, further comprising:

detecting presence of a request for accessing files; and starting the purging step when the access detecting step detects an absence of a file accessing request.

14. A method according to claim 12, wherein the restoring step includes executing an exclusive OR (XOR) operation between parity data in the parity block corresponding to the selected data block and data in the corresponding data block on the non-selected one of the first storage media.

* * * * *